United States Patent
Arriola et al.

(10) Patent No.: US 11,526,252 B2
(45) Date of Patent: Dec. 13, 2022

(54) METHOD AND APPARATUS FOR NAVIGATING A HIERARCHICAL MENU BASED USER INTERFACE

(71) Applicant: SONY INTERACTIVE ENTERTAINMENT LLC, San Mateo, CA (US)

(72) Inventors: George A. Arriola, San Francisco, CA (US); Michael P. Bauerly, San Francisco, CA (US); Manabu Sakamoto, Tokyo (JP); Carsten Schwesig, San Francisco, CA (US); Nicholas Trotta, San Francisco, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 415 days.

(21) Appl. No.: 15/799,910

(22) Filed: Oct. 31, 2017

(65) Prior Publication Data

US 2018/0129375 A1    May 10, 2018

Related U.S. Application Data (63) Continuation of application No. 13/030,525, filed on Feb. 18, 2011, now abandoned.

(51) Int. Cl.
*G06F 3/0482* (2013.01)
*H04N 21/482* (2011.01)

(52) U.S. Cl.
CPC ....... *G06F 3/0482* (2013.01); *H04N 21/4821* (2013.01)

(58) Field of Classification Search
CPC ........... G06F 17/30716; G06F 3/04842; G06F 3/0482; H04N 21/482; H04N 21/4821
See application file for complete search history.

(56) References Cited

U.S. PATENT DOCUMENTS

| 5,920,316 A | 7/1999 | Oran et al. |
| 6,678,891 B1 | 1/2004 | Wilcox et al. |

(Continued)

FOREIGN PATENT DOCUMENTS

| TW | 200503514 | 1/2005 |
| TW | I278744 | 4/2007 |

(Continued)

OTHER PUBLICATIONS

Sacco, Giovanni Maria Maria et al., "User Interface Design" (p. 75); http://moritz.stefaner.eu/downloads/papers/DynTax Ch UI.pdf; 2009.

*Primary Examiner* — Jennifer N Welch
*Assistant Examiner* — Amy P Hoang
(74) *Attorney, Agent, or Firm* — Haverstock & Owens, A Law Corporation (57) ABSTRACT

Methods and apparatus are provided for a user interface to allow for navigating a hierarchical menu. In one embodiment a method includes displaying a user interface including one or more menu elements, wherein each menu element is associated with a row of content titles that may be displayed by the user interface and detecting an input command associated with a menu element. The method may further include updating the display of the user interface based on the input command, wherein presentation of a row of content titles associated with the menu element is updated to allow for navigation within the row, and wherein content titles presented by the user interface for the menu element are a subset of content titles that may be accessed based on the menu element. The method may allow for bypassing one or more levels of the hierarchical menu.

20 Claims, 9 Drawing Sheets

(56) References Cited

U.S. PATENT DOCUMENTS

| | | | |
|---|---|---|---|
| 7,191,411 B2* | 3/2007 | Moehrle | G06F 3/0482 715/855 |
| 7,194,698 B2* | 3/2007 | Gottfurcht | G06F 3/0238 715/811 |
| 7,373,612 B2 | 5/2008 | Risch et al. | |
| 7,457,532 B2 | 11/2008 | Barde et al. | |
| 7,673,240 B2 | 3/2010 | Morgan | |
| 2001/0013877 A1 | 8/2001 | Fujino | G06F 3/0481 715/835 |
| 2003/0151621 A1 | 8/2003 | McEvilly et al. | |
| 2004/0165013 A1 | 8/2004 | Nelson et al. | |
| 2004/0205536 A1* | 10/2004 | Newman | G06T 11/206 715/234 |
| 2004/0233239 A1* | 11/2004 | Lahdesmaki | G06F 3/0482 715/810 |
| 2007/0136681 A1 | 6/2007 | Miller | |
| 2007/0157232 A1 | 7/2007 | Dunton et al. | |
| 2007/0300256 A1* | 12/2007 | Coomer | H04N 5/44543 725/44 |
| 2008/0147810 A1* | 6/2008 | Kumar | G06Q 10/107 709/206 |
| 2008/0174570 A1* | 7/2008 | Jobs | G06F 3/0488 345/173 |
| 2009/0006201 A1* | 1/2009 | Faseler, Jr. | G06Q 30/0277 705/14.73 |
| 2009/0012846 A1* | 1/2009 | Ertell | G06Q 30/0601 705/27.2 |
| 2009/0024926 A1 | 1/2009 | Morotomi | |
| 2009/0063972 A1 | 3/2009 | Ma et al. | |
| 2009/0070815 A1 | 3/2009 | Barrett et al. | |
| 2009/0125571 A1 | 5/2009 | Kiilerich et al. | |
| 2009/0125842 A1 | 5/2009 | Nakayama | |
| 2010/0095224 A1 | 4/2010 | Kozell-Epstein et al. | |
| 2010/0107068 A1 | 4/2010 | Butcher | |
| 2010/0175022 A1 | 7/2010 | Diehl et al. | |
| 2010/0262995 A1 | 10/2010 | Woods et al. | |
| 2011/0022310 A1* | 1/2011 | Ishii | B60R 11/0258 701/532 |
| 2011/0055760 A1* | 3/2011 | Drayton | G06F 3/0482 715/834 |
| 2011/0107220 A1 | 5/2011 | Perlman | |
| 2011/0138313 A1 | 6/2011 | Decker et al. | |
| 2011/0208732 A1 | 8/2011 | Melton et al. | |
| 2011/0283322 A1 | 11/2011 | Hamano | |
| 2011/0289427 A1* | 11/2011 | Toprani | G06F 3/0488 715/746 |

FOREIGN PATENT DOCUMENTS

| | | |
|---|---|---|
| TW | 200719204 | 5/2007 |
| TW | 200832154 | 8/2008 |
| TW | 200928952 | 7/2009 |
| TW | I321282 | 3/2010 |

\* cited by examiner

METHOD AND APPARATUS FOR NAVIGATING A HIERARCHICAL MENU BASED USER INTERFACE

RELATED APPLICATIONS

This application is a continuation of co-pending U.S. patent application Ser. No. 13/030,525, filed on Feb. 18, 2011, and entitled "METHOD AND APPARATUS FOR NAVIGATING A HIERARCHICAL MENU BASED USER INTERFACE" which is also hereby incorporated by reference in its entirety.

FIELD

The present disclosure relates generally to user interfaces for electronic devices and applications, and more particularly to methods and apparatus for presenting a user interface menu allowing for presentation and selection of media content.

BACKGROUND

User interfaces for navigating collections of media typically require navigation based on a hierarchy. For example, a conventional user interface displaying a menu may require a user to select a series of levels of the user interface to access content. Typically, the conventions user interface require a user to select a particular path, identifying criteria for each level of a menu hierarchy. For example, for a conventional user interface to displaying a list of movies an exemplary set of user selections may include, Movies, Genres, Action, list of movies. Further, the user must typically then search a displayed movie list or navigate to a page with in the list of movies to select a movie title. It is an inherent problem in conventional user interfaces that require hierarchical navigation that users need to complete several navigation steps prior to being able to select a particular title. Another drawback of convention hierarchical user interface menus may be that each selection of the user interface can result in a delay due to transmitting and/or loading data. In particular, users accessing data via a network connection can experience extended periods of delay for each navigation step. Similar problems may result when navigating back to initials levels of the menu. There is a desire to for a technical solution that overcomes one or more of the drawbacks of convention hierarchical menu selection. Further, there is a desire for functionality by devices and applications including a user interface that provide useful technological solutions and functionality that may increase consumer interest, including bypassing one or more levels of a menu.

BRIEF SUMMARY OF THE EMBODIMENTS

Disclosed and claimed herein are methods and apparatus for presenting a user interface to allow for navigating a hierarchical menu. In one embodiment, a method includes displaying, by a device, a user interface including one or more menu elements, wherein each menu element is associated with a row of content titles that may be displayed by the user interface, and detecting an input command, by the device, associated with a menu element. The method further includes updating the display of the user interface based on the input command, wherein presentation of a row of content titles associated with the menu element is updated to allow for navigation within the row, and wherein content titles presented by the user interface for the menu element are a subset of content titles that may be accessed based on the menu element.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

One aspect of the disclosure relates to presenting a user interface. In particular, methods and devices are provided for presentation of content and navigation of user interface elements. In one embodiment, a user interface is provided that may allow for a user to browse and/or select one or more media files. The user interface may display one or more elements including content titles, wherein the content titles relate to media files that may be stored by a device or accessed based on communication with a network. One of the advantages of the embodiments described herein may be the ability to present one or more content titles in a unique and interesting fashion that aids in selection. These features may be particularly desirable when many content titles are available for presentation. Features of the embodiments are directed to browsing and selecting content for viewing and playback, such as movies, broadcast programming, video data, audio data, etc.

In one embodiment, a method is presented for displaying user interface elements including one or more menu elements and a row of content titles for each menu element. The display of the user interface may be associated with a user interface architecture, wherein a cursor focus or highlighting attribute may be employed to navigate to one or more elements of the display. In one embodiment, rows of content titles may be presented to allow a user to select a content title of the row, navigate content tiles within the row, and navigate to one ore more adjacent rows of content titles. In that fashion, the user interfaced may provide a parallax view which may allow for a user to navigate to content and bypass one or more hierarchical levels for categorizing content. Further presentation of the user interface may allow for previewing and interaction with individual content items while display one or more menu elements.

In another embodiment, a device is provided which may be configured to present a user interface application as discussed herein. The device may be configured to communicate via a network connection to allow for presentation of one or more media files not stored by the device.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, one or more embodiments are described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the embodiments are essentially the code segments to perform the necessary tasks. The code segments can be stored in a processor readable medium, which may include any medium that can store or transfer information. Examples of the processor readable mediums include an electronic circuit, a semiconductor memory device, a read-only memory (ROM), a flash memory or other non-volatile memory, a floppy diskette, a CD-ROM, an optical disk, a hard disk, etc.

Exemplary Embodiments

Figure 1:
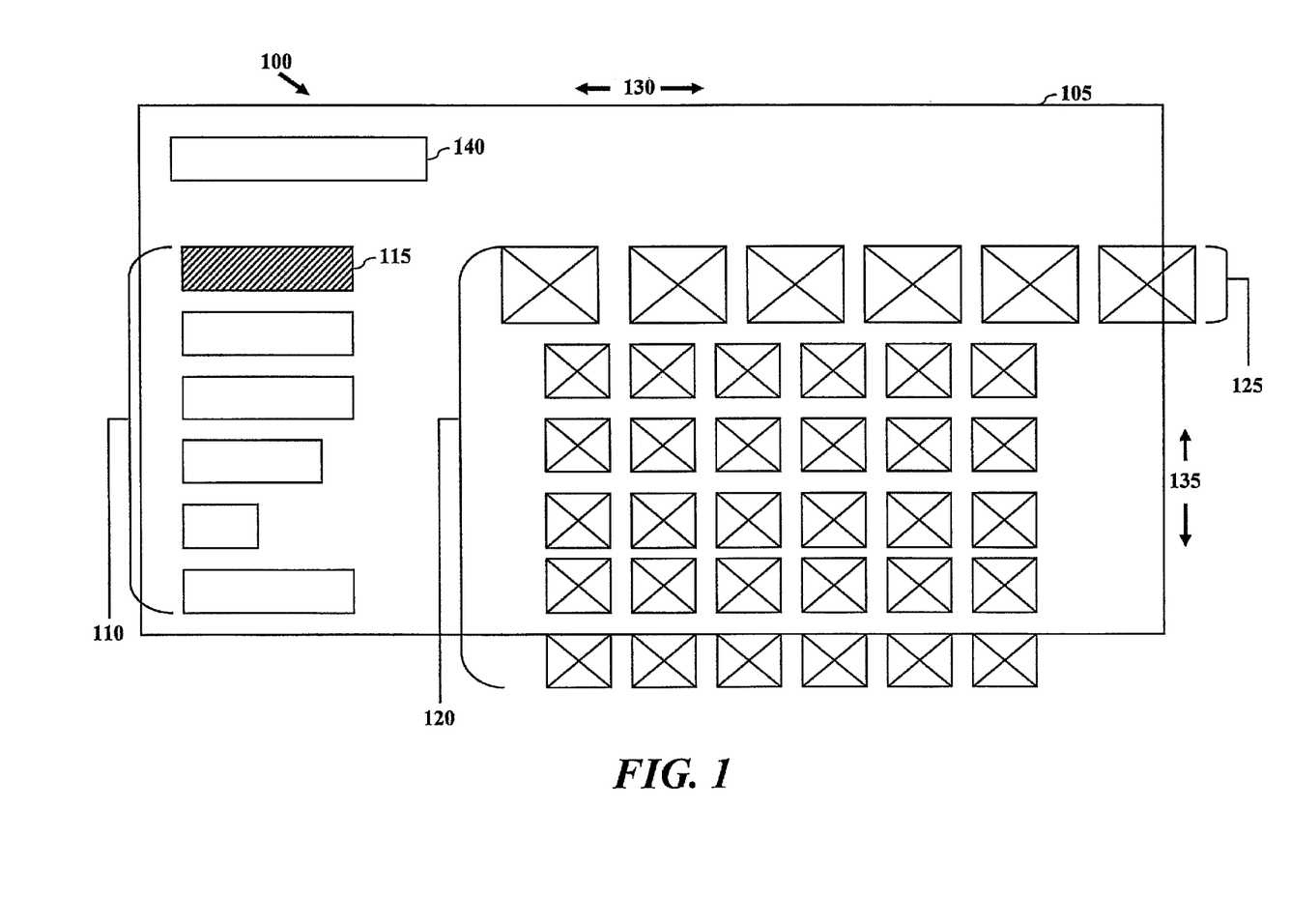
FIG. 1 depicts a graphical representation of a user interface according to one or more embodiments.

Referring now to the figures, FIG. 1 depicts a graphical representation of a user interface architecture according to one or more embodiments. User interface 100 may be employed by one or more devices to present content associated a hierarchical menu structure. In particular, user interface 100 may allow for navigation of a hierarchical menu for browsing and selecting content. According to one embodiment, a versatile approach is provided for navigating a hierarchical menu. For example, user interface 100 may allow for users to bypass hierarchical navigation and select one or more graphical elements associated with content. Further, user interface 100 may allow for interaction and navigation of a portion of the user interface associated with the graphical representations of content.

Presentation of user interface 100 may be associated with a display window of a device, depicted as 105. Navigation of user interface 100 within display window 105 may be based on positioning of a cursor and/or by applying a focus characteristic, such as highlighting to an element that may be selected (e.g., cursor focus). Based on one or more directional inputs, the cursor focus may be applied to another element of the user interface for selection. As depicted in FIG. 1, one or more graphical elements may be presented in display window 105 including menu elements 110. Menu 110 may relate to categories for selecting content. Display of menu 110 may relate to a level of a hierarchy, wherein selection of a text menu item may allow a user to navigate to a different level of content. User interface 110 may additionally include presentation of one or more graphical elements associated with a rows of content titles, depicted as 120, that act as a preview of content for the currently highlighted menu option. Users can navigate the menu hierarchy by selecting one of elements of menu 110, or by moving a cursor focus to select an individual preview tile. According to another embodiment, based on the position of cursor focus of a menu item, presentation of preview content for the currently highlighted menu option may be enhanced to allow for browsing of the content without requiring navigation of a menu hierarchy for that menu element. Menu element 115 is depicted as the currently focused menu element. Row 125 relates to the currently focused row, that is the row associated with menu element 115. Based on selection of a menu element 115, the display of row 125 will be updated to include identify row of content titles. One advantage of the invention may allow for cursor focus to be moved to row 125 for selection of a content title. Navigation of row 125 may be based on one or more directional commands for selecting a preview tile as shown by 130 (e.g., horizontal navigation). Navigation between rows may be based on one or more directional commands as shown by 135 (vertical navigation).

According to another embodiment, based on a selection of menu 110, user interface 100 may display the selected menu item as graphical element 140 to identify a selected category associated with menu 110. In addition, menu 110 may be updated based on one or more sub-categories for graphical element 140. Similarly, rows of preview of content for the currently highlighted menu element may additionally be updated.

Figure 2:
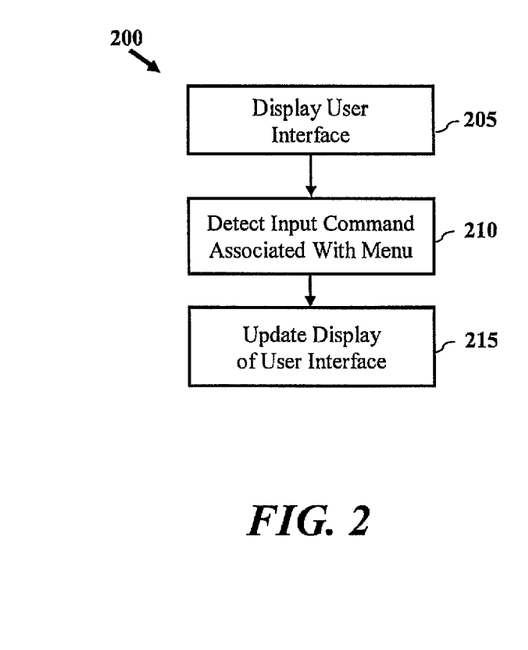
FIG. 2 depicts a process for presenting a user interface according to one or more embodiments.

Referring now to FIG. 2, a process is depicted for presenting a user interface according to one or more embodiments. The user interface may relate to an executable application configured to allow for navigating a hierarchical menu to browse and/or select one or more content titles. Process 200 may be based on the user interface structure discussed above with reference to FIG. 1 and may be employed by computing devices, personal communication devices, media players, gaming systems, etc. Accordingly, process 200 is discussed as being performed by a device. However, it should also be appreciated that elements of process 200 may be performed by computer readable program code executed by one or more devices.

Process 200 may be initiated by at block 205 by displaying a user interface. The user interface display may include one more menu elements and rows of content titles. In one embodiment, each menu element is associated with a row of content titles that may be displayed by the user interface. Each menu element may relate to a category for selecting content and is associated with a level of the hierarchical menu. For example, from a home or top level of the menu, menu elements may be provided associated with selection of different types of content titles, such as movies, broadcast programming (e.g., tv programs), audio or music data, network based content, etc. The user interface may include one or more subcategories for each menu element based on the content that may be accessed or presented to a user. For movie content for example, menu elements may be provided for subcategories of a movie menu element, such as genre, ratings, actors, etc. Each subcategory may contain one or more subcategories for characterizing content. According to one embodiment of the invention, the user interface presented by process 200 can allow for bypassing one or more hierarchical levels of categories and subcategories by presenting content titles that may be accessed without requiring hierarchical navigation for each level of the user interface. Bypassing one or more subcategories may advantageously provide a unique and rich experience for users.

According to one embodiment, presentation of the user interface at block 205 may display content titles relating to graphical representations of image data or artwork associated with a media file for one or more of a film, broadcast programming, video data, image data and audio data. Presentation of the user interface may be associated with the architecture discussed above in FIG. 1, wherein one or more menu elements are displayed in a vertical column and content titles are displayed in horizontal rows. The content titles presented by the user interface may relate to a preview of content accessible with one or more subcategories of a menu element.

At block 210, an input command may be detected associated with a menu element. In one embodiment, input commands may relate to one or more directional commands received by a device. For example, when the user interface is displayed by a display device (e.g., tv) or a device having a display (e.g., portable electronic device) input commands may be provided based on directional inputs via a remote control or buttons of an input interface. The user interface may allow for a user to select or highlight a menu element by positioning a focus element, such as a focus cursor with a menu element. When menu elements are arranged vertically, vertical commands (e.g., up, down) may be input to a device to highlight a menu element. Selection of a menu element may result in updating the display to present one or more subcategories of the menu element. As such, the user may navigate one or more levels of the hierarchical menu.

According to one embodiment, directional commands may additionally allow for a user to access one or more content titles presented by the user interface. For example, a horizontal directional command may select of row of content titles associated with the menu item, and/or allow for navigation within a row. In that fashion a user may bypass navigation of hierarchical menu.

Process 200 may proceed to updating the display of the user interface based on the input command at block 215, wherein presentation of a row of content titles associated with the menu element is updated to allow for navigation within the row. Content titles presented by the user interface for the menu element may be a subset of content titles that may be accessed based on the menu element. In one embodiment, updating the display of user interface based on the input command relates to increasing the display size of the content titles for a selected row and adjusting focus attributes of the content titles relative to other rows of the user interface. In another embodiment, updating the display of the user interface based on the input command relates to distorting the display for rows of content titles not associated with the input command. For example, a fish eye focus may be employed to highlight a row of content titles associated with a selected or highlighted menu item, wherein non-selected rows may be displayed with reduced visibility and/or a different focus attributes. Updating the display of user interface based on the input command may additionally provide a scrollable selection of content titles for a row associated with the input command.

Following block 205 of process 200, the user interface may further allow for detecting an input command for selection of a content title and updating a display of the user interface to provide details for a selected content title. Selections of content titles may bypasses one or more levels of the hierarchical menu. In addition, the user interface may detect input commands to vertically shift a cursor focus associated with a row of content titles, and updating the display of a row of content titles based on the vertical command to allow for navigation relative to one or more additional rows of content titles. Similarly, input commands may be detected to horizontally scroll the content titles of a row, and presenting a link to one or more additional titles associated with the menu element.

Although the description of process 200 has been described with reference to media files, it should also be appreciated that the methods and devices described herein are not limited to media content. For example, the devices and methods described herein may be employed for viewing data associated with file management and accessing documents from one or more sources.

Figure 3:
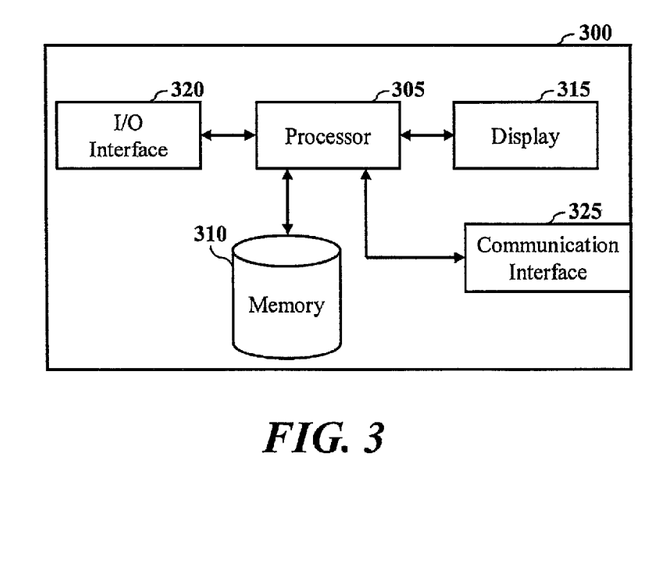
FIG. 3 depicts a simplified block diagram of a device according to one or more embodiments.

Referring now to FIG. 3, a simplified block diagram is depicted of a device according to one or more embodiments. Device 300 may relate to one or more of an electronic device, computing device, a personal communication device, a tablet computer, and device in general configured to provide a user interface application. In one embodiment, device 300 may be configured to provide a user interface of FIG. 1. As depicted in FIG. 3, device 300 includes processor 305, memory 310, display 315, input/output (I/O) interface 320, and communication interface 325. Processor 305 may be configured to control operation of device 300 based on one or more computer executable instructions stored in memory 310. In one embodiment, processor 305 may be configured to provide a user interface for browsing and selection of media content. Memory 310 may relate to one of RAM and ROM memories and may be configured to store one or more files, and computer executable instructions for operation of device 300. Although depicted as a single memory unit, memory 310 may relate to one or more of internal device memory and removable memory. Memory 310 may store one or more media files which may be presented to a user.

Display 315 may be employed to display text, image and/or video data, and display one or more applications executed by processor 305. In certain embodiments, display 315 may relate to a touch screen display. I/O interface 320 may be employed to control operation of device 300 including controlling playback of an eBook and/or digital publication. I/O interface 320 may include one or more buttons for user input, such as a such as a numerical keypad, volume control, menu controls, pointing device, track ball, mode selection buttons, and playback functionality (e.g., play, stop, pause, forward, reverse, slow motion, etc). Buttons of I/O interface 320 may include hard and soft buttons, wherein functionality of the soft buttons may be based on one or more applications running on device 300.

Communication interface 325 may be configured to receive and/or transmit data including content for display and presentation by a user interface, such as media files (e.g., audio, video, image, etc.). Communication interface 325 may be configured to allow for one or more devices to communicate with device 300 via wired or wireless communication. Communication interface 325 may include one or more ports for receiving data, including ports for removable memory. Communication interface 325 may be configured to allow for network based communications including but not limited to LAN, WAN, Wi-Fi, etc. In one embodiment, communication interface 325 may be configured to access media content via a network server.

Figure 4A:
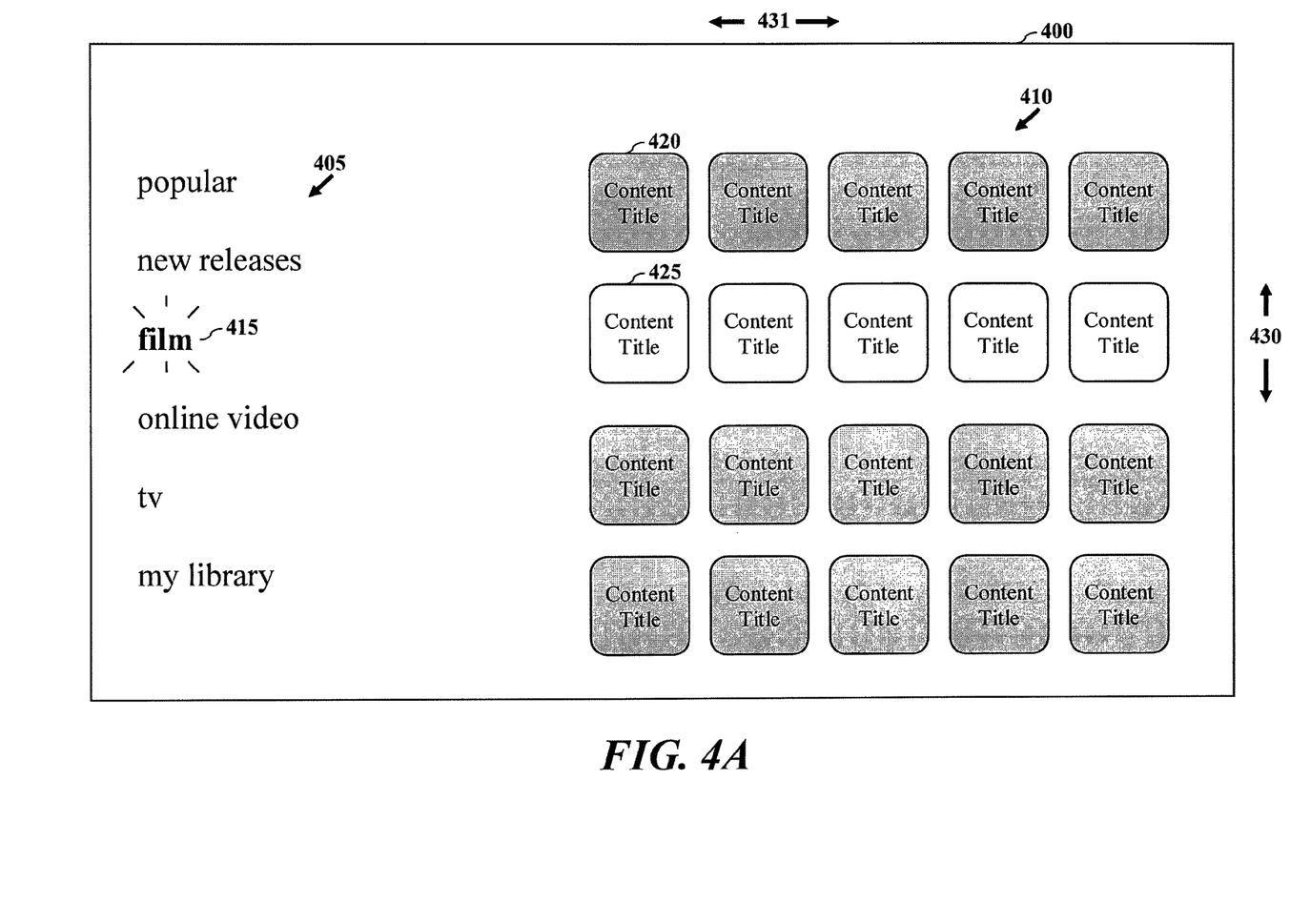
FIGS. 4A-4D depict graphical representations of a user interface according to one or more embodiments.

Referring now to FIGS. 4A-4D, graphical representations are depicted of a user interface according to one or more embodiments. According to one embodiment, a user may navigate user interface 400 to view and/or select content titles, such as one or more media files that may be accessed by a device. User interface 400 may allow for content of files stored by the device or accessible via a network (e.g., network site, network application, etc.) to be presented to a user. Referring first to FIG. 4A, user interface 400 is depicted to include menu 405 and rows of content titles depicted as 410. Elements of menu 405 may relate to graphical representations of text identifying one or more categories that a user may select of highlight to access content. Content titles may be presented as cover artwork for a content title. One advantage of the invention may be that a content title of a row may be selected. In that fashion, user interface may allow for navigation within a row of content titles. Further, rows 410 may provide a visual aesthetic and information related to menu 405.

Presentation and navigation of user interface 400 may be based on the position of a cursor or highlighted element which may be identified by applying a cursor focus to an element. Based on the position of a cursor focus, the user may select an item of the user interface and/or provide one or more commands to change the position of the cursor focus for navigating the user interface.

The configuration of user interface 400 in FIG. 4A may be employed during initial presentation of the user interface for selecting content. As depicted in FIG. 4A, menu item 415 (e.g., film) is depicted as displayed with the cursor focus or highlighting applied. Display of cursor focus may include enlarging the text of the menu item and/or including one or more display attribute such as a glow accent, animation, backlighting, etc. Based on a selected menu element, such as menu element 415 in FIG. 4A, presentation of rows 410 of preview content may be displayed to highlight a row associated with the menu item. Content titles of rows 410 are depicted as tiles or image data, wherein each tile may identify a content title or media file. In one embodiment, graphical elements for rows 410 may relate to cover art for the media titles. In that fashion a user may recognize particular content titles. For rows not associated with the selected menu item 415, each content title, such as content title 420 may be displayed with a particular attributes. For example, content title 420 may be display as partially faded or distorted (e.g., via application of a fish-eye lens appearance). Alternatively, content titles for a row associated with selected menu item 415, such as content title 425, may be displayed to accent the association with the menu item.

Navigation of user interface 400 may be based on one or more directional commands. As depicted in FIG. 4A, vertical commands, as depicted by 430, can position the cursor focus for menu 405. A horizontal command, as depicted by 431 may be employed to select a row, such as the row of content titles associated with content title 425 or return the cursor focus to a menu element.

Figure 4B:
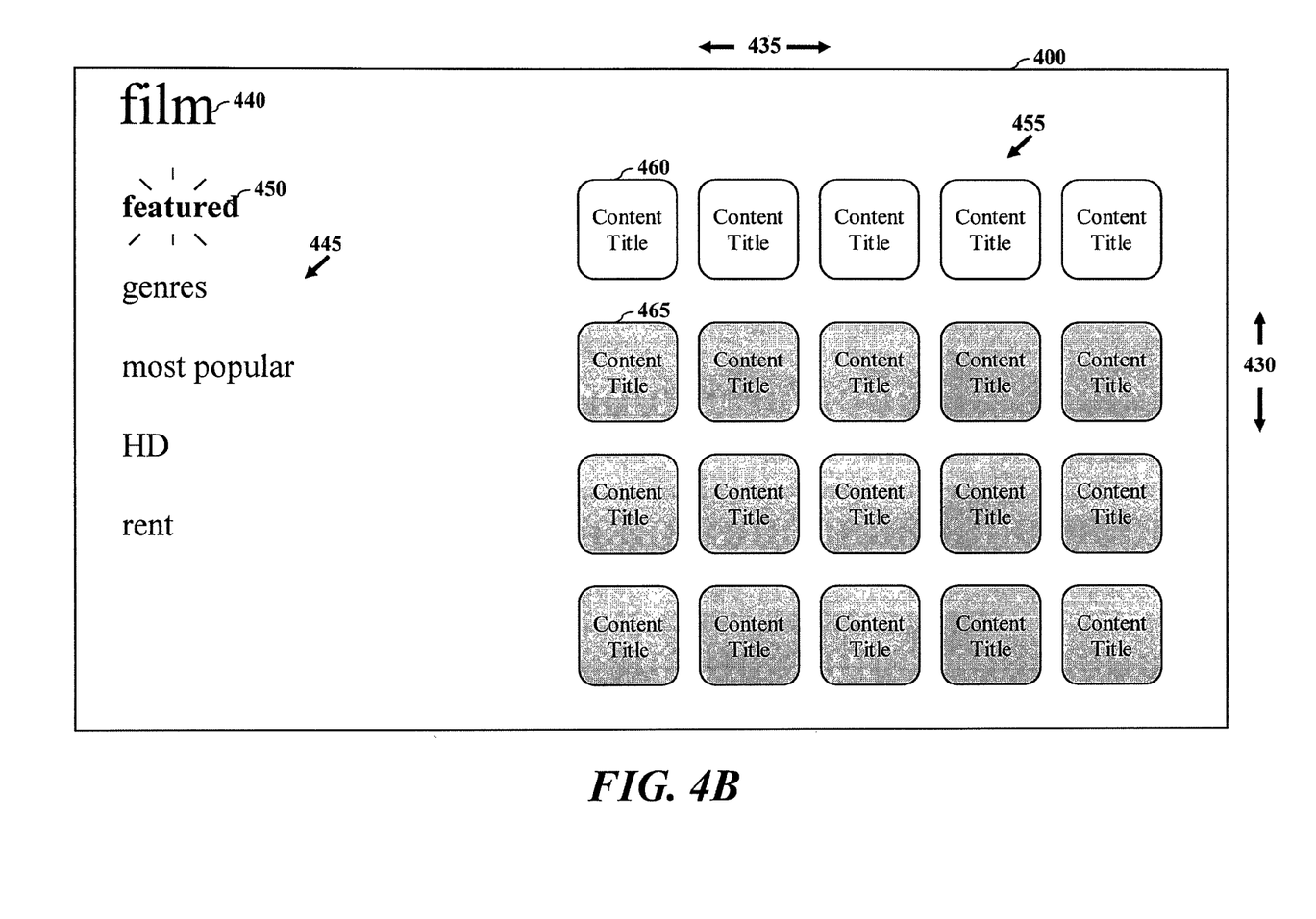

According to one embodiment, user interface 400 may allow for hierarchical navigation, where content may be accessed based on one or more selections of menu 405. Referring now to FIG. 4B, a graphical representation is depicted of user interface 400 based on selection of menu item 415 of FIG. 4A. In FIG. 4B, user interface 400 displays graphical element 440 identifying a previously selected menu element (e.g., menu element 415) and menu 445 based on subcategories for the previously selected menu item. Menu element 450 is depicted as a highlighted menu element to indicate the position of the cursor focus. User interface 400 in FIG. 4B further includes rows 455 of preview content, wherein one row may be displayed to highlight an association with the menu item 450. Based on the position of cursor focus on menu element 450, content titles for a row associated with selected menu item, such as content title 460, may be displayed to identify the association with the menu item. Content titles for the other rows of preview content, such as content title 465, may be displayed as partially faded or distorted. As depicted in FIG. 4B, vertical commands, as depicted by 430, can adjust the cursor focus for menu 445. A horizontal command, as depicted by 435 may be employed to select a row, such as the row of content titles associated with content title 460 or alternatively return to the user interface display configuration of FIG. 4A.

Figure 4C:
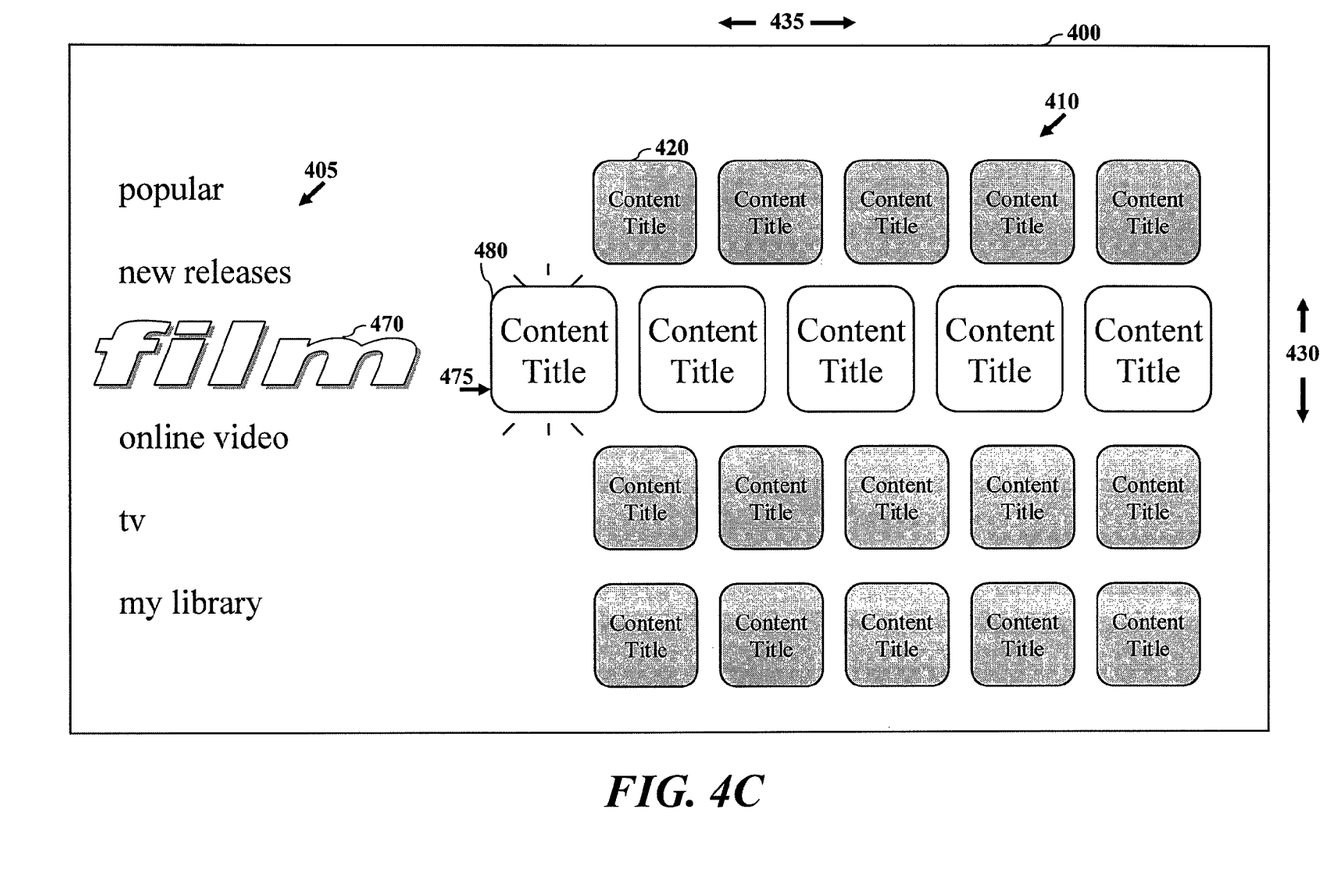

According to one embodiment, user interface 400 may allow for bypassing hierarchical navigation, such that content may be selected based on rows of preview content. Referring now to FIG. 4C, user interface 400 is depicted based on a selection associated with the menu element (e.g., menu element 415 of FIG. 4A). For example, a user may activate a button of an input device or directional command to position focus on the row. User interface 400 may then update the presentation of user interface elements. In FIG. 4C, the menu item, element 470, is depicted with increased sized. Based on the input selection, rows of preview content 410 may additionally be adjusted. In particular, row 475 associated with the menu element 470 may include a cursor focus on content title 480. Further, presentation of the content titles of row 475 may be presented with one or more graphical treatments to enhance the display.

According to one embodiment, selection of a menu item of a content title in a highlighted row may be employed for bypassing the hierarchical menu structure. The user interface view of FIG. 4C, or parallax view, allows for a user to select or browse content titles associated with menu elements. Horizontal directional commands, as shown by direction 435, may be employed to move a focus cursor related to one or more titles of row 475. Such a selection will be discussed in more detail below with respect to FIG. 4D. Selection of a content title may result in bypassing selection of a subcategory, such as the subcategories depicted in FIG. 4B, of menu element 440. Another advantage may be the ability to shift the focus of a particular row to another row based on a vertical directional command. Such a selection will be discussed in more detail below with respect to FIG. 5.

Figure 4D:
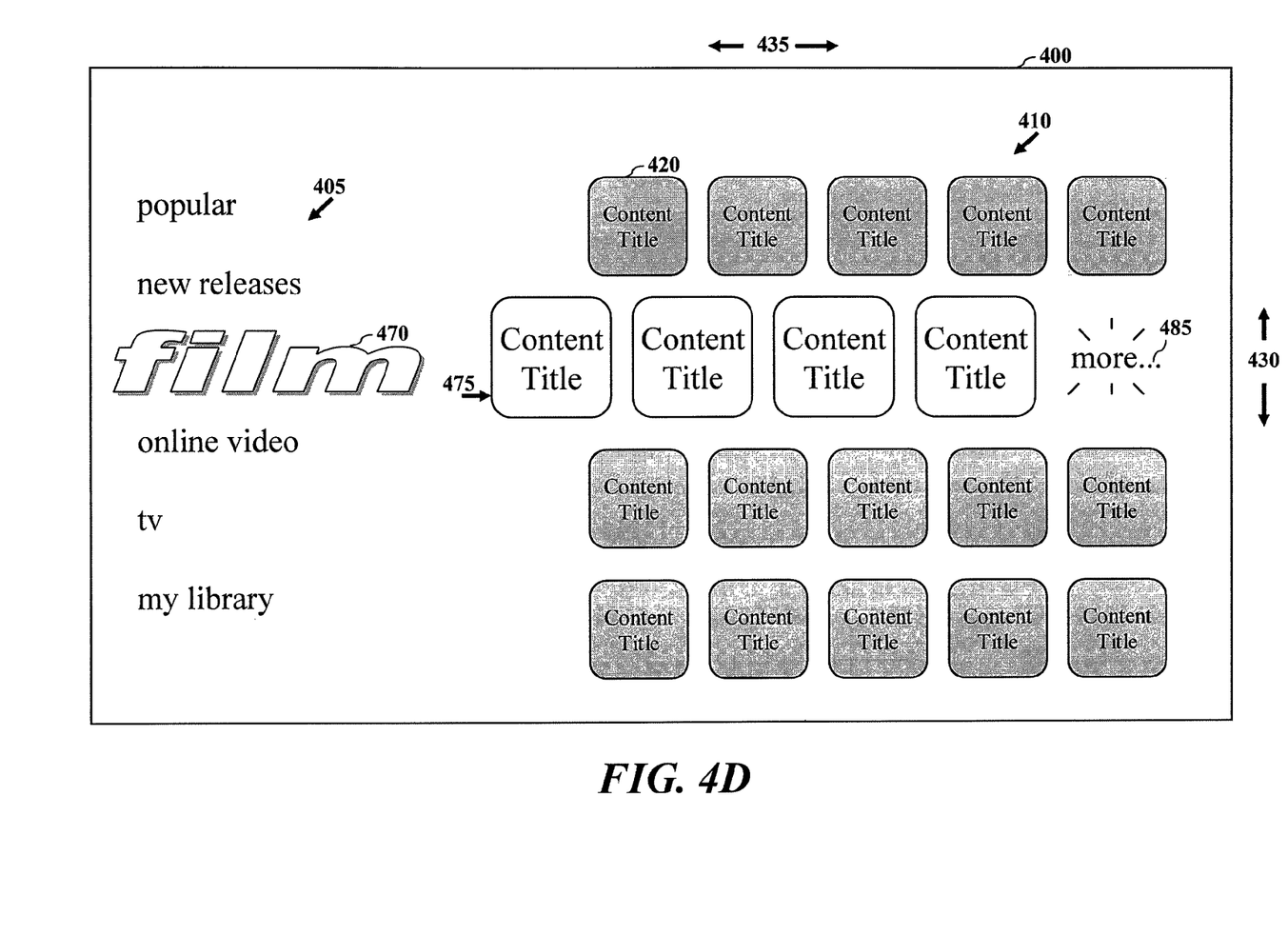

Referring now to FIG. 4D, user interface 400 is depicted based on navigation of content titles of a row of graphical elements according to one embodiment. Navigation of a row of content titles, such as row 475, allows a user to view a portion of content titles that may be associated with menu element 470. In one embodiment, row 475 includes a particular number of titles that may be viewed. Based on one or more directional commands, user interface 400 may update the display of the row to shift one or more content titles into the display window of user interface 400. In certain embodiments, the number of content titles per row may be limited to seven. Each row however, may include a link, depicted as 485, which may be selected by the cursor focus. Selection of link 485 may result in user interface 400 displaying content titles associated with the menu item in a grid view. Displaying of media content in a grid view is discussed in the commonly assigned U.S. patent application Ser. No. 12/966,131, entitled "User Interface For Prioritizing Media Content," and U.S. patent application Ser. No. 12/966,150, entitled "User Interface For Media Content Presentation," which are hereby incorporated by reference.

Figure 5:
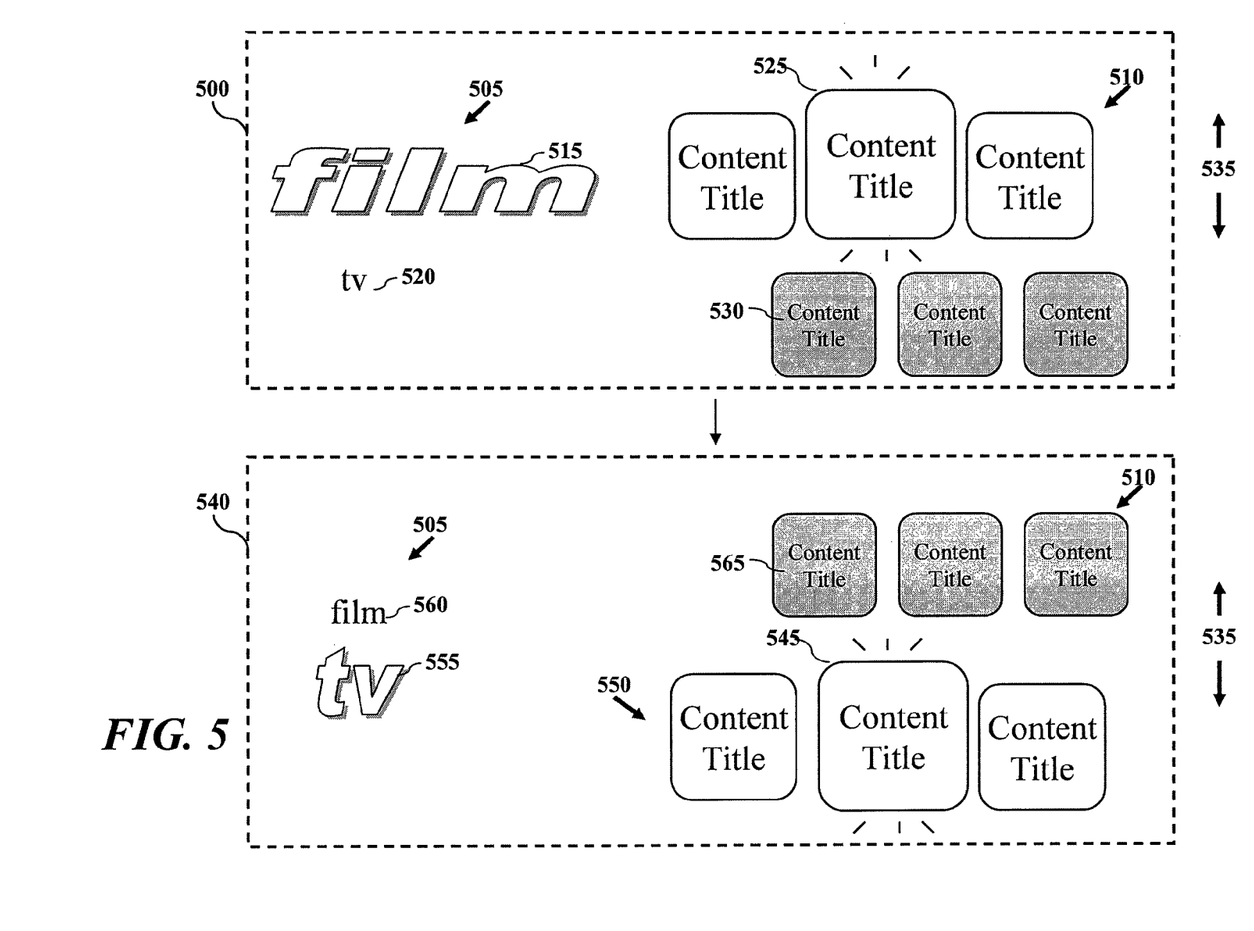
FIG. 5 depicts a graphical representation of user interface presentation according to one or more embodiments.

Referring now to FIG. 5, a graphical representation of user interface presentation is depicted according to one or more embodiments. According to one embodiment, a user interface may allow a user to navigate relative to rows (e.g., rows 120) of content displayed by the user interface. User interface 500 relates to a partial view of a user interface (e.g., user interface 400). User interface 500 includes menu 505 and rows of content 510. Rows of content 510 are presented for each of menu elements 515 and 520. User interface 500 is depicted in a parallax view, wherein menu item 515 is selected. Based on selection of menu item 515, the row of content titles associated with the menu item are presented with focus characteristics to enhance the display. Further, content title 525 is displayed as including the focus cursor and with increased size relative to content titles of other rows. Content titles associated with menu item 520, such as content title 530, may be displayed with different attributes.

According to one embodiment, the user may navigate relative to rows 510 based on one or more vertical directional commands, as depicted by 535. User interface 540 relates to presentation of the user interface 500 following a vertical directional command. As depicted, user interface 540 is updated to shift the cursor focus to tile 545. As such, row 550 of content titles associated with menu item 555 (e.g., menu item 520) are depicted as in focus. Similarly, presentation of menu item 555 is adjusted to identify the change. Presentation of menu item 560 (e.g., menu element 515) and content titles associated with the menu item, such as 565, are additionally modified. One advantage of navigating relate to rows of content titles, or preview content, may be the ability to bypass navigating a hierarchical menu. In contrast to conventional methods which may require returning to particular levels of a menu, the parallax views provides a user greater flexibility in selecting content.

Figure 6:
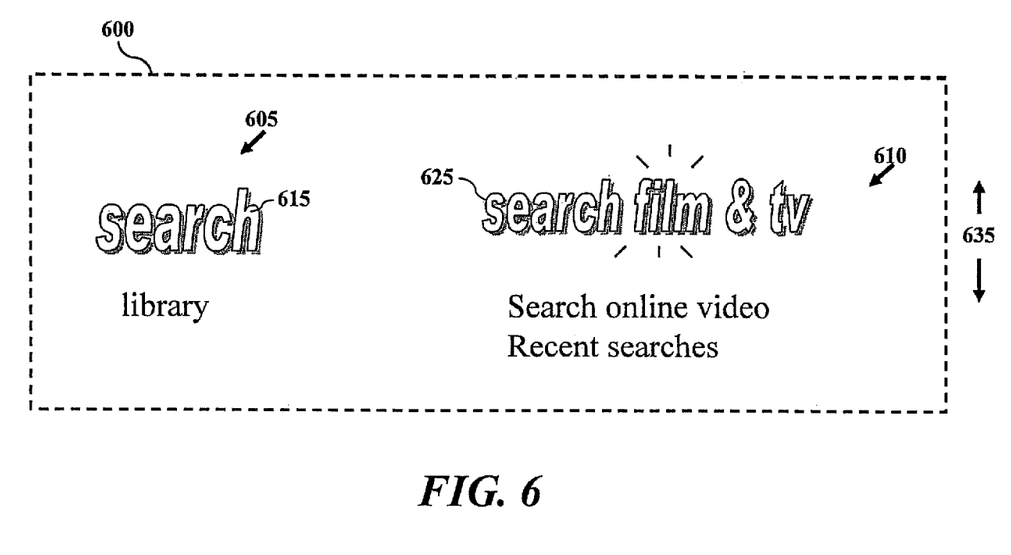
FIG. 6 depicts a graphical representation of user interface presentation according to one or more additional embodiments.

According to one embodiment, some menu elements cannot be represented by content titles. Referring now to FIG. 6, a graphical representation is depicted of user interface operation according to one or more embodiments. User interface 600 includes menu elements 605 and list element 610 which may be accessed by highlighting a menu item. Based on selection of menu item 615, user interface 600 may present list 610 and display an element of the list with the cursor focus. As depicted, element 625 includes cursor focus and may be selected by the user. However, based on one or more directional commands, as shown by 635, the user may select among elements of list 610.

Figure 7:
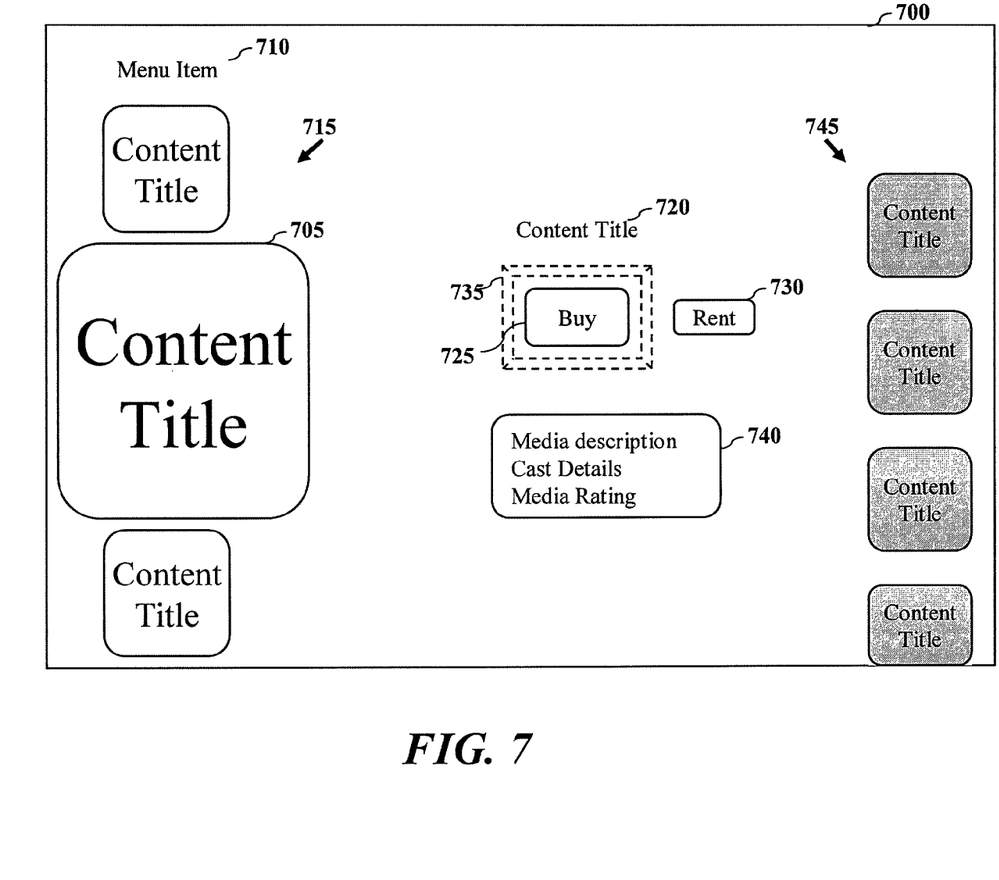
FIG. 7 depicts a graphical representation of detail view for a content title according to one or more embodiments.

According to another embodiment, a user interface may provide detailed information and one or more functions when a content title is selected by a user. Referring now to FIG. 7, a graphical representation of a user interface is depicted for a detail view according to one or more embodiments of the invention. Display of user interface 700 may be based on a selection of a content title from a row or a parallax view as depicted in FIGS. 4C-4D. User interface 700 includes a graphical display of a content title shown as 705. Content title 705 may relate to cover art of the media title and/or a graphical tile including text or graphics associated with the content title.

Presentation of user interface 700 may include graphical element 710 identifying a menu item associated with content title 705. Based on graphical element 710, one or more additional graphical elements may be displayed in listing 715. In that fashion, a user may select different titles associated with a menu item while user interface 700 presents a detailed view. A detailed view allows for a user to view information related to content title 705. User interface 700 may further display text identifying the title of content title 705 shown as 720. The detailed view provided by user interface 700 may include buy button 725 which may be selected by the user to purchase media associated with title 705. Rent button 730 may allow a user to rent content title 705. User interface 700 may further include media data shown as 740 which may be selected by a user to obtain further information and details of content title 705. User interface 700 may further identify one or more content titles, depicted as 745, which may be selected by a user. Content titles 745 may elate to suggested titles based on user selection of content titles 705.

While this disclosure has been particularly shown and described with references to exemplary embodiments thereof, it will be understood by those skilled in the art that various changes in form and details may be made therein without departing from the scope of the embodiments encompassed by the appended claims.

What is claimed is:

1. A method of presenting a user interface to allow for navigating a hierarchical menu, the method comprising:
    displaying, by a device, a user interface including one or more menu elements, wherein each menu element is associated with a row of content titles that may be displayed by the user interface, wherein the content titles include cover art;
    detecting an input command, by the device, associated with a menu element;
    updating the display of the user interface based on the input command, wherein presentation of the row of content titles associated with the menu element is updated to allow for navigation within the row, and
    wherein the content titles presented by the user interface for the menu element are a subset of content titles that may be accessed based on the menu element; and
    detecting an input command to horizontally scroll the content titles of a row, and presenting a link to one or more additional titles associated with the menu element, wherein selection of the link results in the user interface displaying the content titles associated with a menu item in a grid view, and
    displaying the content titles for the row associated with a selected menu item to identify an association with the menu item, based on a position of a cursor focus on the menu element;
    displaying the user interface in a parallax view, wherein the parallax view enables bypassing one or more levels of the hierarchical menu; and
    detecting an input command for selection of a content title and updating a display of the user interface to provide details for a selected content title, wherein the selection bypasses one or more levels of the hierarchical menu.

2. The method of claim 1, wherein the menu element relates to a category for selecting content and is associated with a level of the hierarchical menu.

3. The method of claim 1, wherein the content titles relate to graphical representations of image data or artwork associated with a media file for one or more of a film, broadcast programming, video data, image data and audio data.

4. The method of claim 1, wherein the one or more menu elements are displayed in a vertical column and the content titles are displayed in horizontal rows.

5. The method of claim 1, wherein updating the display of the user interface based on the input command includes increasing the display size of the content titles for a selected row and adjusting focus attributes of the content titles relative to other rows of the user interface.

6. The method of claim 1, wherein updating the display of the user interface based on the input command relates to distorting the display for rows of the content titles not associated with the input command.

7. The method of claim 1, wherein the updating the display of the user interface based on the input command provides a scrollable selection of content titles for a row associated with the input command.

8. The method of claim 1, wherein the content titles presented by the user interface relate to a preview of content accessible with one or more subcategories of the menu element.

9. The method of claim 1, further comprising detecting an input command to vertically shift a cursor focus associated with a row of content titles, and updating the display of the row of content titles based on the vertical command to allow for navigation relative to one or more additional rows of content titles.

10. A non-transitory computer readable medium for storing a computer program product including computer executable code for presenting a user interface to allow for navigating a hierarchical menu, the computer program product comprising:
   computer readable code to display a user interface including one or more menu elements, wherein each menu element is associated with a row of content titles that may be displayed by the user interface, wherein the content titles include cover art;
   computer readable code to detect an input command associated with a menu element;
   computer readable code to update the display of the user interface based on the input command, wherein presentation of the row of content titles associated with the menu element is updated to allow for navigation within the row, and wherein the content titles presented by the user interface for the menu element are a subset of content titles that may be accessed based on the menu element; and
   computer readable code to detect an input command to horizontally scroll the content titles of a row, and present a link to one or more additional titles associated with the menu element, wherein selection of the link results in the user interface displaying the content titles associated with a menu item in a grid view; and
   computer readable code to display the content titles for the row associated with a selected menu item to identify an association with the menu item, based on a position of a cursor focus on the menu element;
   computer readable code to display the user interface in a parallax view, wherein the parallax view enables bypassing one or more levels of the hierarchical menu; and
   computer readable code to detect an input command for selection of a content title and updating a display of the user interface to provide details for a selected content title, wherein the selection bypasses one or more levels of the hierarchical menu.

11. The non-transitory computer readable medium of claim 10, wherein the menu element relates to a category for selecting content and is associated with a level of the hierarchical menu.

12. The non-transitory computer readable medium of claim 10, wherein the content titles relate to graphical representations of image data or artwork associated with a media file for one or more of a film, broadcast programming, video data, image data and audio data.

13. The non-transitory computer readable medium of claim 10, wherein the one or more menu elements are displayed in a vertical column and the content titles are displayed in horizontal rows.

14. The non-transitory computer readable medium of claim 10, wherein updating the display of the user interface based on the input command includes increasing display size of the content titles for a selected row and adjusting focus attributes of the content titles relative to other rows of the user interface.

15. The non-transitory computer readable medium of claim 10, wherein updating the display of the user interface based on the input command relates to distorting the display for rows of the content titles not associated with the input command.

16. The non-transitory computer readable medium of claim 10, wherein the updating the display of the user interface based on the input command provides a scrollable selection of content titles for a row associated with the input command.

17. The non-transitory computer readable medium of claim 10, wherein the content titles presented by the user interface relate to a preview of content accessible with one or more subcategories of the menu element.

18. The non-transitory computer readable medium of claim 10, further comprising computer readable code to detect an input command to vertically shift a cursor focus associated with a row of content titles, and update the display of the row of content titles based on the vertical command to allow for navigation relative to one or more additional rows of content titles.

19. A device comprising:
   a display; and
   a processor coupled to the display, the processor configured to
      display a user interface including one or more menu elements, wherein each menu element is associated with a row of content titles that may be displayed by the user interface, wherein the content titles include cover art;
      detect an input command associated with a menu element;
      update the display of the user interface based on the input command, wherein presentation of the row of content titles associated with the menu element is updated to allow for navigation within the row, and wherein the content titles presented by the user interface for the menu element are a subset of content titles that may be accessed based on the menu element; and
      detect an input command to horizontally scroll the content titles of a row; and
      present a link to one or more additional titles associated with the menu element, wherein selection of the link results in the user interface displaying the content titles associated with a menu item in a grid view; and display the content titles for the row associated with a selected menu item to identify an association with the menu item, based on a position of a cursor focus on the menu element;

display the user interface in a parallax view, wherein the parallax view enables bypassing one or more levels of the hierarchical menu; and detect an input command for selection of a content title and updating a display of the user interface to provide details for a selected content title, wherein the selection bypasses one or more levels of the hierarchical menu.

20. The device of claim 19, wherein the device relates to one or more of a media player, electronic device, personal communication device, handheld computing device, and computing device in general.

\* \* \* \* \*